United States Patent
Endresen

(10) Patent No.: US 8,537,888 B2
(45) Date of Patent: Sep. 17, 2013

(54) METHOD, DEVICE, AND COMPUTER-READABLE MEDIUM FOR VIDEO CODING AND DECODING

(75) Inventor: Lars Petter Endresen, Nesoddtangen (NO)

(73) Assignee: Cisco Technology, Inc., San Jose, CA (US)

( * ) Notice: Subject to any disclaimer, the term of this patent is extended or adjusted under 35 U.S.C. 154(b) by 501 days.

(21) Appl. No.: 12/832,634

(22) Filed: Jul. 8, 2010

(65) Prior Publication Data

US 2011/0026583 A1 Feb. 3, 2011

Related U.S. Application Data

(60) Provisional application No. 61/223,937, filed on Jul. 8, 2009.

(30) Foreign Application Priority Data

Jul. 9, 2009 (NO) .................................. 20092615

(51) Int. Cl.
*H04N 7/12* (2006.01)
*H04N 11/02* (2006.01)
*H04N 7/50* (2006.01)

(52) U.S. Cl.
USPC .......................................... 375/240; 375/244

(58) Field of Classification Search
USPC .......................................................... 375/240
See application file for complete search history.

(56) References Cited

U.S. PATENT DOCUMENTS 7,295,613 B2 * 11/2007 Bjontegaard ............. 375/240.18
8,254,455 B2 * 8/2012 Wu et al. .................. 375/240.16

* cited by examiner

*Primary Examiner* — Sath V Perungavoor
*Assistant Examiner* — Howard D Brown, Jr.
(74) *Attorney, Agent, or Firm* — Oblon, Spivak, McClelland, Maier & Neustadt, L.L.P.

(57) ABSTRACT

A method, device, and computer-readable medium for video coding or decoding wherein a number of blocks of residual picture data respectively stored in a number of first data arrays in a memory of a computer device represent at least a part of a video picture to be coded or decoded. The method includes calculating DC coefficients respectively associated with the blocks and inserting the DC coefficients in a second data array in a block associative order, classifying each of the blocks as skipped in response to an associated DC coefficient being lower than a predefined threshold, and non-skipped in response to the associated DC coefficient being higher than a predefined threshold, generating a bit mask containing 1-bits in positions corresponding to positions in the second data array having DC coefficients higher than the predefined threshold, and 0-bits in positions corresponding to positions in the second data array having DC coefficients lower than the predefined threshold.

12 Claims, 4 Drawing Sheets

Figure 2

| 20 | 31 | 27 | 13 | 11 | 2 | 10 | 5 |
|---|---|---|---|---|---|---|---|
| -2 | -1 | -1 | -1 | -1 | 0 | -1 | 0 |
| -2 | -1 | -1 | 0 | 0 | 0 | -1 | 1 |
| -2 | -1 | -1 | 0 | 0 | 0 | -1 | 0 |
| -2 | -2 | -2 | 0 | 0 | 0 | -1 | 0 |
| -2 | -1 | -2 | 0 | -1 | 0 | -1 | 0 |
| -2 | -1 | -2 | 0 | -1 | 0 | 0 | 0 |
| -2 | -1 | -1 | 0 | -1 | 0 | -1 | 0 |
| -1 | -2 | -2 | -1 | -1 | -1 | -1 | 0 |
| -1 | -2 | -2 | 0 | -1 | 0 | 0 | 0 |
| -1 | -3 | -2 | 0 | -1 | 0 | -1 | 0 |
| -1 | -2 | -2 | -1 | -1 | 0 | -1 | 0 |
| -1 | -2 | -2 | -2 | -1 | -1 | -1 | 0 |
| 0 | -3 | -2 | -2 | 0 | 0 | 0 | 1 |
| 0 | -4 | -1 | -2 | 1 | 0 | 0 | 1 |
| 0 | -3 | -2 | -2 | 1 | 0 | 0 | 1 |
| -1 | -2 | -2 | -2 | 0 | 0 | 0 | 1 |

METHOD, DEVICE, AND COMPUTER-READABLE MEDIUM FOR VIDEO CODING AND DECODING

CROSS-REFERENCE TO RELATED APPLICATIONS

The present application claims the benefit under 35 U.S.C. §119 from U.S. Provisional Application No. 61/223,937, filed Jul. 8, 2009, and claims priority to Norwegian Patent Application No. 20092615, filed Jul. 9, 2009, which are both herein incorporated by reference in their entirety.

BACKGROUND

1. Technological Field

The present disclosure relates to implementation of early skip of transform coefficients related to video compression systems in computer devices.

2. Description of the Related Art

Transmission of moving pictures in real-time is employed in several applications, such as, but not limited to, video conferencing, net meetings, television (TV) broadcasting, video telephony, or the like.

However, representing moving pictures requires bulk information as digital video and is generally described by representing each pixel in a picture with 8 bits (1 byte). Such uncompressed video data results in large bit volumes, and cannot be transferred over conventional communication networks and transmission lines in real time due to limited bandwidth.

Thus, enabling real time video transmission requires a large extent of data compression. Data compression may, however, compromise the picture quality. Therefore, great efforts have been made to develop compression techniques allowing real time transmission of high quality video over bandwidth limited data connections.

In video compression systems, the main goal is to represent the video information with as little capacity as possible. Capacity is defined with bits, either as a constant value or as bits/time unit. In both cases, the main goal is to reduce the number of bits.

The most common video coding method is described in the Moving Picture Experts Group (MPEG) and H.26 standards. The video data undergoes four main processes before transmission. These processes include prediction, transformation, quantization, and entropy coding.

The prediction process significantly reduces the amount of bits required for each picture in a video sequence to be transferred. This process takes advantage of the similarity of parts of the sequence with other parts of the sequence. Since the predictor part is known to both encoder and decoder, only the difference has to be transferred. This difference generally requires much less capacity for its representation. The prediction is mainly based on picture content from previously reconstructed pictures where the location of the content is defined by motion vectors. The prediction process is generally performed on square block sizes (i.e., 16×16 pixels). In some cases, however, predictions of pixels based on the adjacent pixels in the same picture, rather than pixels of preceding pictures, are used. This process is referred to as intra prediction (not to be confused with inter prediction).

The residual represented as a block of data (i.e., 4×4 pixels) still contains internal correlation. A conventional method, which takes advantage of this, performs a two dimensional block transform. The International Telecommunication Union (ITU) recommendation, H.264, uses a 4×4 integer type transform. This transforms 4×4 pixels into 4×4 transform coefficients, which can usually be represented by fewer bits than the pixel representation. Transform of a 4×4 array of pixels with internal correlation may result in a 4×4 block of transform coefficients with much fewer non-zero values than the original 4×4 pixel block.

Direct representation of the transform coefficients is still too costly for many applications. A quantization process is carried out for a further reduction of the data representation. Thus, the transform coefficients undergo quantization. The possible value range of the transform coefficients is divided into value intervals each limited by an uppermost and lowermost decision value, and assigned a fixed quantization value. The transform coefficients are then quantified to the quantization value associated with the intervals within which the respective coefficients reside. Coefficients which are lower than the lowest decision value are quantified to zeros (0s). Note that this quantization process results in the reconstructed video sequence being different, when compared to the uncompressed sequence.

As noted above, one characteristic of video content to be coded is that the requirements for bits to describe the sequence is strongly varying. For several applications, it is conventionally known that the content in a considerable part of the picture is unchanged from frame to frame. H.264 widens this definition such that parts of the picture with constant motion can also be coded without use of additional information. Regions with little or no change from frame to frame require a minimum number of bits to be represented. The blocks included in such regions are defined as "skipped," thereby reflecting that no changes or only predictable motion relative to the corresponding previous blocks occur. Thus, no data is required to represent these blocks other than an indication that the blocks are to be decoded as "skipped."

One test for determining whether a block should be defined as "skipped," is to compare a predefined threshold with the Discrete Cosine (DC) transform coefficient of the block in question. The DC coefficient is localized in the upper left corner of a block after transformation, and expresses the sum of the absolute values of the corresponding residual values. Taking into account that the transform coefficients undergo a subsequent quantization process, it is assumed that if the DC transform is below a predefined threshold (i.e., corresponding to the lowest quantization level), then all the transform coefficients are zero (0) or close to zero (0), and the block can be defined as "skipped."

FIG. 1 is a simplified sketch of an H.264 encoder which shows a current frame 100, a reference frame 105, and a reconstructed frame 110. The H.264 encoder includes units which perform certain processes. For example, some H.264 encoder processes may include motion estimation 115, intra prediction 120, mode decision 125, deblocking filtering 130, transformation 135, quantization 140, inverse transformation 145, inverse quantization 150, and Context-adaptive variable-length coding (CAVLC) 155. In this figure, the residual data is the input to the transform 135. If this residual is sufficiently small, the time consuming procedures of integer transform 135, quantization 140, inverse integer transform 145, and inverse quantization 150 can be skipped altogether as indicated above. However, conventional algorithms implementing this aspect of H.264 test all 4×4 macroblocks to discover the "skipped" blocks, and are therefore inefficient in regard to processor consumption and delay concerns.

SUMMARY

A method, device, and computer-readable medium for video coding or decoding wherein a number of blocks of residual picture data respectively stored in a number of first data arrays in a memory of a computer device represent at least a part of a video picture to be coded or decoded. The method includes calculating DC coefficients respectively associated with the blocks and inserting the DC coefficients in a second data array in a block associative order, classifying each of the blocks as skipped in response to an associated DC coefficient being lower than a predefined threshold, and non-skipped in response to the associated DC coefficient being higher than a predefined threshold, generating a bit mask containing 1-bits in positions corresponding to positions in the second data array having DC coefficients higher than the predefined threshold, and 0-bits in positions corresponding to positions in the second data array having DC coefficients lower than the predefined threshold, and in response to the bit mask containing 1-bits, counting the number of bit positions in the bit mask from a rightmost position to the first occurrence of a 1-bit and storing the result in a scan variable, adding the value of the scan variable to a jump variable, incrementing a count variable, storing the value of the jump variable in an offset array indexed with the value of the count variable, and shifting the bit mask (scan+1) times to the right.

As should be apparent, a number of advantageous features and benefits are available by way of the disclosed embodiments and extensions thereof. It is to be understood that any embodiment can be constructed to include one or more features or benefits of embodiments disclosed herein, but not others. Accordingly, it is to be understood that the embodiments discussed herein are provided as examples and are not to be construed as limiting, particularly since embodiments can be formed to practice the invention that do not include each of the features of the disclosed examples.

BRIEF DESCRIPTION OF THE DRAWINGS

The disclosure will be better understood from reading the description which follows and from examining the accompanying figures. These are provided solely as non-limiting examples of embodiments. In the drawings:

FIG. 2 is a table illustrating arrays of residual data in a computer memory storing blocks of residual video data;

DETAILED DESCRIPTION

FIG. 2 illustrates an arrangement of residual values in a computer memory. Each row of FIG. 2 represents one 4×4 macroblock. The number to the right of each row represents the Discrete Cosine (DC) value of the respective row. Thus, in FIG. 2, the numbers 20, 31, 27, 13, 11, 2, 10, and 5 represent DC values.

In determining which of the blocks are to be defined as "skipped," in a computer implemented video encoder, the DC values, which in the simplest form are the sums of the absolute values of each of the eight (8) rows in FIG. 2, are first calculated. Thus, for example, the DC value of the first row of FIG. 2 is:

$$(1+1+1+1+1+1+2+2+2+2+2+2)=20$$

Next, an 8-bit mask may be generated, containing ones (1s) in the positions corresponding to row numbers having DC values higher than a predefined threshold (T), and zeros (0s) in the positions corresponding to row numbers having DC values lower than the predefined threshold (T). Finally, the sum of ones (1s) in the 8-bit mask is stored, in addition to the offset of the non-zero elements.

After calculating the DC values, the method generates an 8-bit mask where "1" means that the 4×4 macroblock sum is higher than a predefined threshold, and thereafter the number of ones (1s) is counted using the efficient population count (POPCNT) function. In hexadecimal notation, this can be expressed as follows:

DC_HI=DC>threshold
(T)=FFFFFFFFFFFFFFFFFFFFFFFF00FFFF00
bit.mask (M)=1111111111110110
bit.count (C)=14

Both "bit.mask" and "bit.count" are used as an input to later steps in the coding process, and bit.mask is also used internally in the loop explained in the following.

The method then obtains the positions in the DC array having values above the predefined threshold, and then submits the blocks to undergo further coding steps, such as quantization and entropy coding. The aforementioned is accomplished without having to loop through all the values and positions of the DC array, but according to the present disclosure, by jumping directly to the positions corresponding to the non-skipped blocks.

Figure 1:
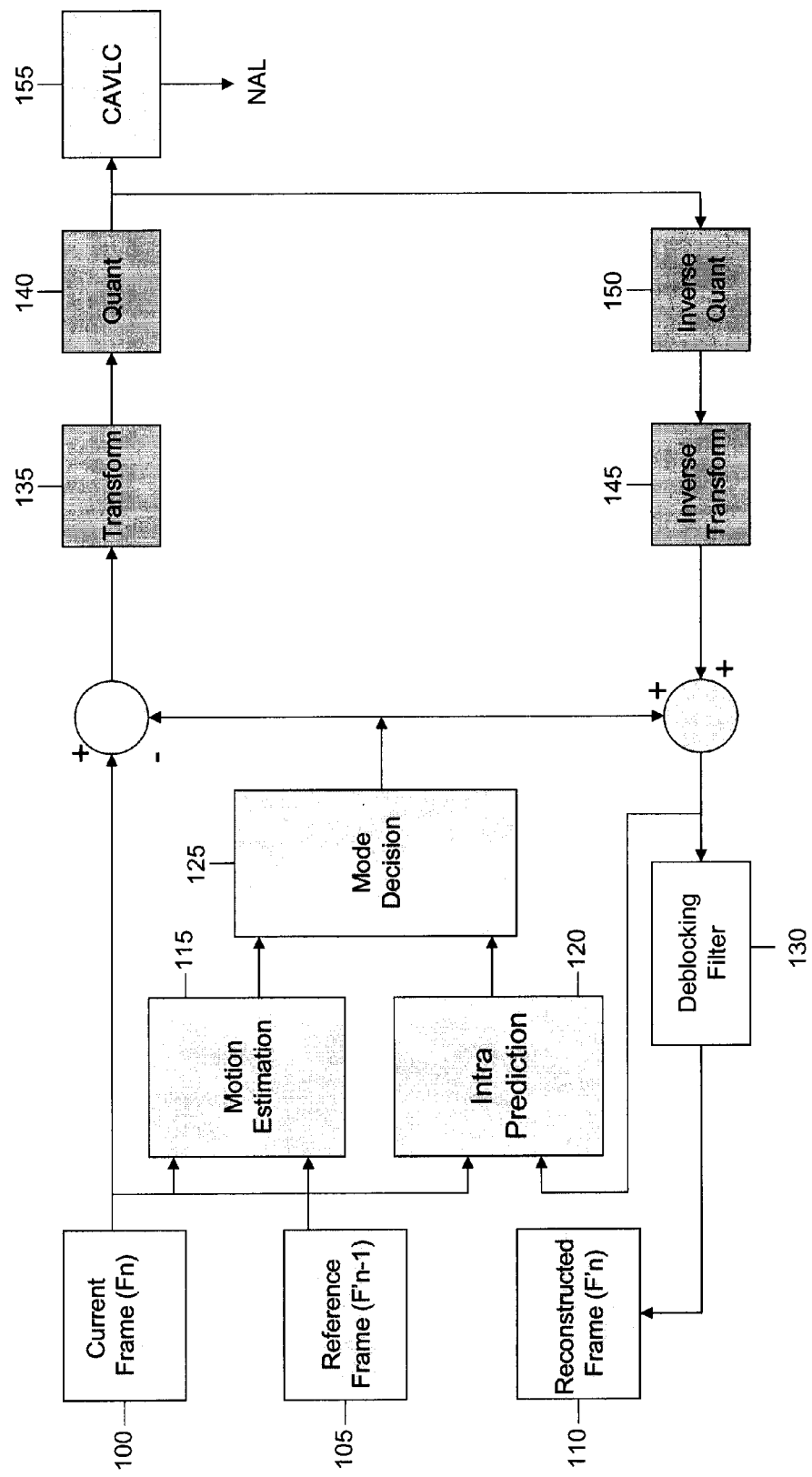
FIG. 1 is a block chart illustrating some of the processes in conventional video coding.
Figure 3:
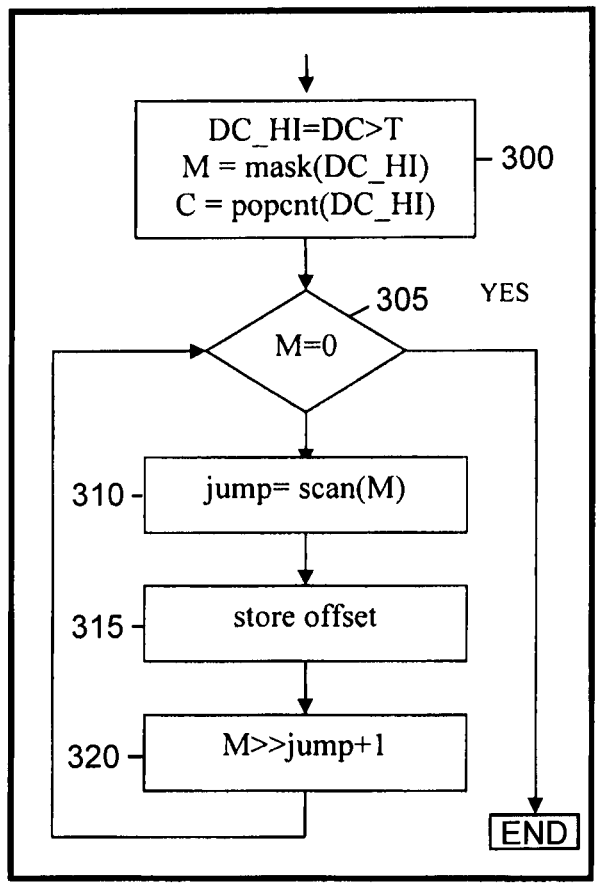
FIG. 3 is a flow chart illustrating a computer implemented part of a coding process according to the present disclosure.

FIG. 3 illustrates one embodiment of the present disclosure which performs the aforementioned calculations. The embodiment efficiently masks, counts, and scans the DC values using optimized C++ functions move mask (MOVE MASK), population count (POPCNT), and bit scan (BIT SCAN FORWARD).

In this way, the efficiency of this exemplary embodiment is to a large extent based on an adoption of the problem at hand with the available hardware resources in modern microprocessors.

The process of FIG. 3 starts, as noted above, by determining whether the DC values are greater than a predetermined threshold, and performing masking and counting of the DC values, as shown in step 300. Next, at step 305, the method checks whether a mask (M), which initially was set to bit-.mask referred to above, is equal to zero (0) or not. Note that when mask (M) is zero, all coefficients are zero (0).

If bit.mask is not equal to zero (0), a scan function is used, at step 310, to jump to the rightmost non-zero bit in M (least significant bit), i.e., the number of positions from the rightmost bit in M to the least significant bit is determined. Thus, if M is non-zero, the C++ function Bit Scan Forward may be used to scan for the first bit that equals one (1). Bit Scan Forward returns the bit index of the least significant bit of an integer (i.e., in the case of M, the first position of a one (1) starting from the right-hand side). This number is stored in a first variable (scan), then added to a second variable (jump), and the result is stored in the memory, at step 315, as an offset indexed with the loop number to differentiate between the offset values.

At step 320, M is then shifted "scan+1" times to the right for discarding from M the bits to the right of the current position, and the bit in the current position itself. By doing this, the content of M corresponding to offset positions already stored, is removed from M, and the loop can be applied in the same way to obtain the remaining positions corresponding to "non-skipped" blocks. Then, the process is looped back to the zero-check of M, and if M still contains non-zero bits, the process is repeated using the same variables.

The loop iterates exactly as many times as the number of 4×4 macroblock sums that is lower than the threshold (T). Thus, expensive if-tests inside the loop which compare each 4×4 sums with the threshold are avoided, which would have resulted in a branch miss-prediction.

Below is an example of how the present disclosure may be implemented with standard C++ functions.

```
bit.mask = mask = __mm__movemask__epi8(DC__HI);
bit.count = __popcnt32(bit.mask);
i=0;
jump=0;
while (mask)
{
  int scan = __bit__scan__forward(mask);
  jump = jump + scan;
  transOffset[i++] = (short)(jump++ << 4);
  mask = mask >> scan + 1;
}
```

The function "_mm_movemask_epi8" calculates a 16-bit mask from the most significant bits of 16 8-bit integers. The function "_popcnt32" calculates the number of bits of the parameter that are set to one (1). The function "_bit_scan_forward" returns the bit index of the least significant set bit of the input argument.

After carrying out a procedure according to the present disclosure, it is known from the indexed offset values which of the 4×4 macroblocks are determined as non-skipped according to the video standard, and the internal memory address of the transform coefficients thereof which are stored, for example, as in FIG. 2, can also be derived.

Figure 4:
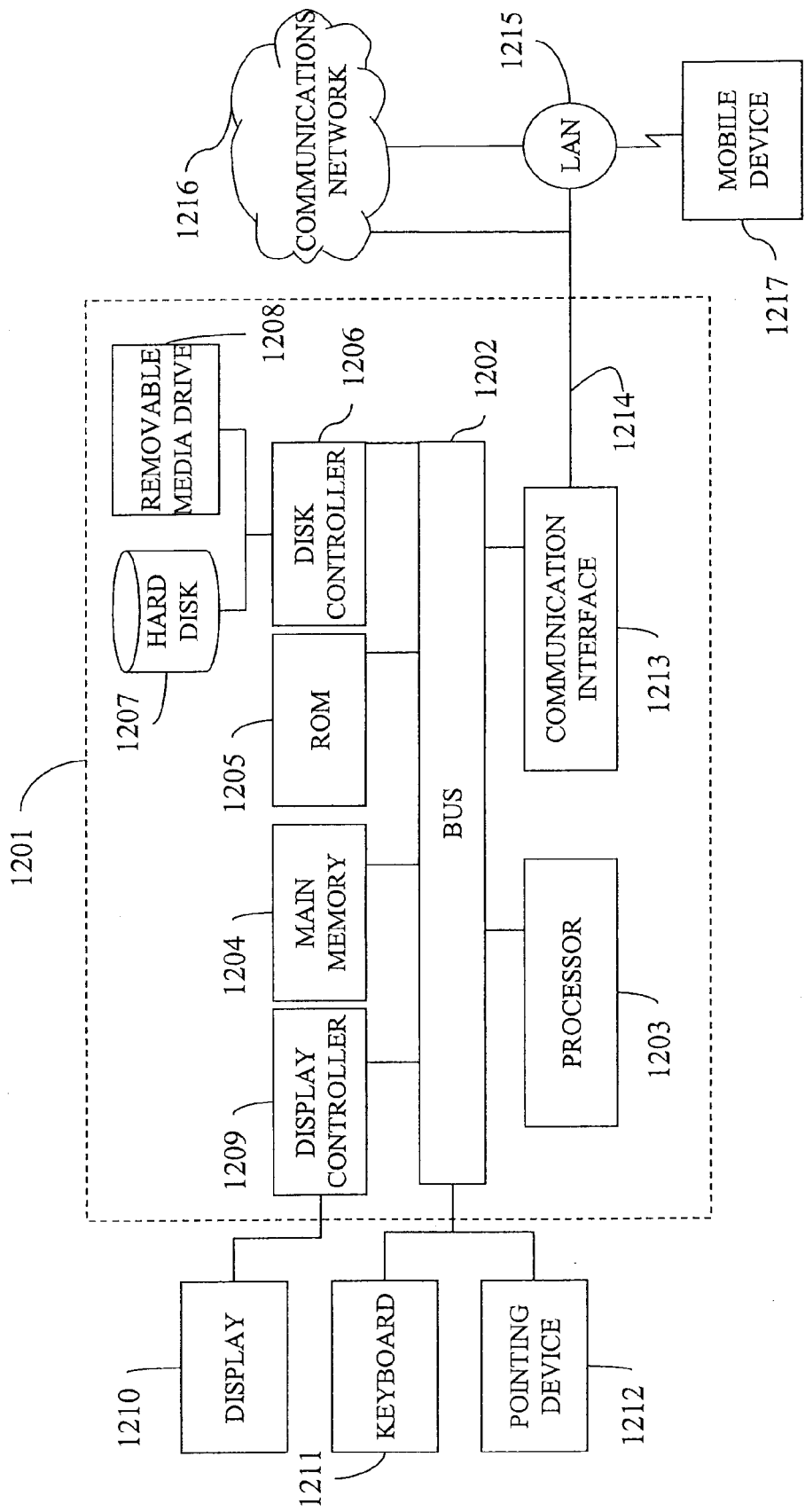
FIG. 4 illustrates a computer system upon which an embodiment of the present disclosure may be implemented.

FIG. 4 illustrates a computer system 1201 upon which an embodiment of the present disclosure may be implemented. The computer system 1201 includes a disk controller 1206 coupled to the bus 1202 to control one or more storage devices for storing information and instructions, such as a magnetic hard disk 1207, and a removable media drive 1208 (e.g., floppy disk drive, read-only compact disc drive, read/write compact disc drive, compact disc jukebox, tape drive, and removable magneto-optical drive). The storage devices may be added to the computer system 1201 using an appropriate device interface (e.g., small computer system interface (SCSI), integrated device electronics (IDE), enhanced-IDE (E-IDE), direct memory access (DMA), or ultra-DMA).

The computer system 1201 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)).

The computer system 1201 may also include a display controller 1209 coupled to the bus 1202 to control a display 1210, such as the touch panel display 101 or a liquid crystal display (LCD), for displaying information to a computer user. The computer system includes input devices, such as a keyboard 1211 and a pointing device 1212, for interacting with a computer user and providing information to the processor 1203. The pointing device 1212, for example, may be a mouse, a trackball, a finger for a touch screen sensor, or a pointing stick for communicating direction information and command selections to the processor 1203 and for controlling cursor movement on the display 1210.

The computer system 1201 performs a portion or all of the processing steps of the present disclosure in response to the processor 1203 executing one or more sequences of one or more instructions contained in a memory, such as the main memory 1204. Such instructions may be read into the main memory 1204 from another computer readable medium, such as a hard disk 1207 or a removable media drive 1208. One or more processors in a multi-processing arrangement may also be employed to execute the sequences of instructions contained in main memory 1204. In alternative embodiments, hard-wired circuitry may be used in place of or in combination with software instructions. Thus, embodiments are not limited to any specific combination of hardware circuitry and software.

As stated above, the computer system 1201 includes at least one computer readable medium or memory for holding instructions programmed according to the teachings of the present disclosure and for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other optical medium, punch cards, paper tape, or other physical medium with patterns of holes.

Stored on any one or on a combination of computer readable media, the present disclosure includes software for controlling the computer system 1201, for driving a device or devices for implementing the invention, and for enabling the computer system 1201 to interact with a human user. Such software may include, but is not limited to, device drivers, operating systems, and applications software. Such computer readable media further includes the computer program product of the present disclosure for performing all or a portion (if processing is distributed) of the processing performed in implementing the invention.

The computer code devices of the present embodiments may be any interpretable or executable code mechanism, including but not limited to scripts, interpretable programs, dynamic link libraries (DLLs), Java classes, and complete executable programs. Moreover, parts of the processing of the present embodiments may be distributed for better performance, reliability, and/or cost.

The term "computer readable medium" as used herein refers to any non-transitory medium that participates in providing instructions to the processor 1203 for execution. A computer readable medium may take many forms, including but not limited to, non-volatile media or volatile media. Non-volatile media includes, for example, optical, magnetic disks, and magneto-optical disks, such as the hard disk 1207 or the removable media drive 1208. Volatile media includes dynamic memory, such as the main memory 1204. Transmission media, on the contrary, includes coaxial cables, copper wire and fiber optics, including the wires that make up the bus 1202. Transmission media also may also take the form of acoustic or light waves, such as those generated during radio wave and infrared data communications.

Various forms of computer readable media may be involved in carrying out one or more sequences of one or more instructions to processor 1203 for execution. For example, the instructions may initially be carried on a magnetic disk of a remote computer. The remote computer can load the instructions for implementing all or a portion of the present disclosure remotely into a dynamic memory and send the instructions over a telephone line using a modem. A modem local to the computer system 1201 may receive the data on the telephone line and place the data on the bus 1202. The bus 1202 carries the data to the main memory 1204, from which the processor 1203 retrieves and executes the instructions. The instructions received by the main memory 1204 may optionally be stored on storage device 1207 or 1208 either before or after execution by processor 1203.

The computer system 1201 also includes a communication interface 1213 coupled to the bus 1202. The communication interface 1213 may include the transmitter, the receiver, or both (i.e., a transceiver), of the present disclosure. The communication interface 1213 provides a two-way data communication coupling to a network link 1214 that is connected to, for example, a local area network (LAN) 1215, or to another communications network 1216 such as the Internet. For example, the communication interface 1213 may be a network interface card to attach to any packet switched LAN. As another example, the communication interface 1213 may be an integrated services digital network (ISDN) card. Wireless links may also be implemented. In any such implementation, the communication interface 1213 sends and receives electrical, electromagnetic or optical signals that carry digital data streams representing various types of information.

The network link 1214 typically provides data communication through one or more networks to other data devices. For example, the network link 1214 may provide a connection to another computer through a local network 1215 (e.g., a LAN) or through equipment operated by a service provider, which provides communication services through a communications network 1216. The local network 1214 and the communications network 1216 use, for example, electrical, electromagnetic, or optical signals that carry digital data streams, and the associated physical layer (e.g., CAT 5 cable, coaxial cable, optical fiber, etc.). The signals through the various networks and the signals on the network link 1214 and through the communication interface 1213, which carry the digital data to and from the computer system 1201 may be implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The computer system 1201 can transmit and receive data, including program code, through the network(s) 1215 and 1216, the network link 1214 and the communication interface 1213. Moreover, the network link 1214 may provide a connection through a LAN 1215 to a mobile device 1217 such as a personal digital assistant (PDA) laptop computer, or cellular telephone.

Further, it should be appreciated that the exemplary embodiments of the present disclosure are not limited to the exemplary embodiments shown and described above. While this invention has been described in conjunction with exemplary embodiments outlined above, various alternatives, modifications, variations and/or improvements, whether known or that are, or may be, presently unforeseen, may become apparent. Accordingly, the exemplary embodiments of the present disclosure, as set forth above are intended to be illustrative, not limiting. The various changes may be made without departing from the spirit and scope of the invention. Therefore, the disclosure is intended to embrace all now known or later-developed alternatives, modifications, variations and/or improvements.

The invention claimed is:

1. A method in a video coding or decoding process implemented in a computer device wherein a number of blocks of residual picture data respectively stored in a number of first data arrays in a memory of the computer device represent at least a part of a video picture to be coded or decoded, the method comprising:
    calculating DC coefficients respectively associated with the blocks and inserting the DC coefficients in a second data array in a block associative order;
    classifying each of the blocks as skipped in response to an associated DC coefficient being lower than a predefined threshold, and non-skipped in response to the associated DC coefficient being higher than the predefined threshold;
    generating a bit mask containing 1-bits in positions corresponding to positions in the second data array having DC coefficients higher than the predefined threshold, and 0-bits in positions corresponding to positions in the second data array having DC coefficients lower than the predefined threshold; and
    in response to the bit mask containing 1-bits,
        counting the number of bit positions in the bit mask from a rightmost position to the first occurrence of a 1-bit and storing the result in a scan variable,
        adding the value of the scan variable to a jump variable,
        incrementing a count variable,
        storing the value of the jump variable in an offset array indexed with the value of the count variable, and
        shifting the bit mask (scan+1) times to the right.

2. The method according to claim 1, wherein the predefined threshold is a smallest decision value of a number of decision values associated with quantization of DC coefficients.

3. The method according to claim 1, wherein the blocks are 4×4 macroblocks, and the second data array includes eight DC coefficients respectively associated with eight 4×4 macroblocks.

4. The method according to claim 1, further comprising:
    deriving data addresses to the respective residual picture data of blocks classified as non-skipped, when fetched from the memory in the coding or decoding process from corresponding consecutive indexed values in the offset array.

5. A non-transitory computer-readable storage medium including computer executable instructions, wherein the instructions, when executed by a computer, cause the computer to perform a method in a video coding or decoding process implemented in a computer device wherein a number of blocks of residual picture data respectively stored in a number of first data arrays in a memory of the computer device represent at least a part of a video picture to be coded or decoded, the method comprising:
    calculating DC coefficients respectively associated with the blocks and inserting the DC coefficients in a second data array in a block associative order;
    classifying each of the blocks as skipped in response to an associated DC coefficient being lower than a predefined threshold, and non-skipped in response to the associated DC coefficient being higher than the predefined threshold;
    generating a bit mask containing 1-bits in positions corresponding to positions in the second data array having DC coefficients higher than the predefined threshold, and 0-bits in positions corresponding to positions in the second data array having DC coefficients lower than the predefined threshold; and in response to the bit mask containing 1-bits,
  counting the number of bit positions in the bit mask from a rightmost position to the first occurrence of a 1-bit and storing the result in a scan variable,
  adding the value of the scan variable to a jump variable,
  incrementing a count variable,
  storing the value of the jump variable in an offset array indexed with the value of the count variable, and
  shifting the bit mask (scan+1) times to the right.

6. The non-transitory computer-readable storage medium according to claim 5, wherein the predefined threshold is a smallest decision value of a number of decision values associated with quantization of DC coefficients.

7. The non-transitory computer-readable storage medium according to claim 5, wherein the blocks are 4×4 macroblocks, and the second data array includes eight DC coefficients respectively associated with eight 4×4 macroblocks.

8. The non-transitory computer-readable storage medium according to claim 5, further comprising:
  deriving data addresses to the respective residual picture data of blocks classified as non-skipped, when fetched from the memory in the coding or decoding process from corresponding consecutive indexed values in the offset array.

9. An apparatus for video coding or decoding wherein a number of blocks of residual picture data respectively stored in a number of first data arrays in a memory of the apparatus represent at least a part of a video picture to be coded or decoded, the apparatus comprising:
  a video processor configured to,
    calculate DC coefficients respectively associated with the blocks and insert the DC coefficients in a second data array in a block associative order,
    classify each of the blocks as skipped in response to an associated DC coefficient being lower than a predefined threshold, and non-skipped in response to the associated DC coefficient being higher than the predefined threshold,
    generate a bit mask containing 1-bits in positions corresponding to positions in the second data array having DC coefficients higher than the predefined threshold, and 0-bits in positions corresponding to positions in the second data array having DC coefficients lower than the predefined threshold, and
    in response to the bit mask containing 1-bits,
      count the number of bit positions in the bit mask from a rightmost position to the first occurrence of a 1-bit and storing the result in a scan variable,
      add the value of the scan variable to a jump variable,
      increment a count variable,
      store the value of the jump variable in an offset array indexed with the value of the count variable, and
      shift the bit mask (scan+1) times to the right.

10. The apparatus according to claim 9, wherein the predefined threshold is a smallest decision value of a number of decision values associated with quantization of DC coefficients.

11. The apparatus according to claim 9, wherein the blocks are 4×4 macroblocks, and the second data array includes eight DC coefficients respectively associated with eight 4×4 macroblocks.

12. The apparatus according to claim 9, wherein the video processor is further configured to derive data addresses to the respective residual picture data of blocks classified as non-skipped, when fetched from the memory from corresponding consecutive indexed values in the offset array.

\* \* \* \* \*